United States Patent
Sunnari et al.

(10) Patent No.: US 9,625,717 B2
(45) Date of Patent: Apr. 18, 2017

(54) OPTICAL DEVICE WITH DIFFRACTIVE GRATING

(71) Applicant: TEKNOLOGIAN TUTKIMUSKESKUS VTT, Vuorimiehentie (FI)

(72) Inventors: Antti Sunnari, Espoo (FI); Olli-Heikki Huttunen, Oulu (FI); Juuso Olkkonen, Espoo (FI)

(73) Assignee: DISPELIX OY, Helsinki (FI)

( * ) Notice: Subject to any disclaimer, the term of this patent is extended or adjusted under 35 U.S.C. 154(b) by 0 days.

(21) Appl. No.: 14/429,782

(22) PCT Filed: Sep. 18, 2013

(86) PCT No.: PCT/FI2013/050903
§ 371 (c)(1),
(2) Date: Mar. 20, 2015

(87) PCT Pub. No.: WO2014/044912
PCT Pub. Date: Mar. 27, 2014

(65) Prior Publication Data
US 2015/0253570 A1 Sep. 10, 2015

(30) Foreign Application Priority Data
Sep. 20, 2012 (FI) ...................................... 20125971

(51) Int. Cl.
*G02B 27/01* (2006.01)
*G02B 27/42* (2006.01)
(Continued)

(52) U.S. Cl.
CPC ....... *G02B 27/0101* (2013.01); *G02B 5/1809* (2013.01); *G02B 5/1823* (2013.01);
(Continued)

(58) Field of Classification Search
CPC ...... G02B 5/18; G02B 5/1814; G02B 5/1866; G02B 5/1871; B42D 25/328
(Continued)

(56) References Cited

U.S. PATENT DOCUMENTS 4,484,797 A  11/1984  Knop et al.
4,856,869 A  8/1989  Sakata et al.
(Continued)

FOREIGN PATENT DOCUMENTS

EP  0618473 A2  10/1994
EP  1353197 A2  10/2003
(Continued)

OTHER PUBLICATIONS

Hooper et al., "The optical response of single-interface and thin slab dielectric gratings", Journal of Optics A: Pure and Applied Optics, 8, 2006, p. 250-263.

*Primary Examiner* — Kimberly N Kakalec
(74) *Attorney, Agent, or Firm* — Reed Smith LLP

(57) ABSTRACT

The invention relates to optical devices comprising a transparent substrate and a first transparent grating layer on the substrate, the grating layer comprising periodically alternating zones having different refractive indices. According to the invention, the device comprises a second transparent grating layer located on top of the first grating layer and also comprising periodically alternating zones having different refractive indices so that the zones of the first grating layer having higher refractive index are at least partly aligned with the zones of the second grating layer having lower refractive index and vice versa, the second grating layer reducing the amount of light diffracted to non-zero transmission orders. The invention allows for reducing the so-called rainbow effect for example in head-up displays (HUDs).

17 Claims, 7 Drawing Sheets

(51) Int. Cl.
*F21V 8/00* (2006.01)
*G02B 5/18* (2006.01)

(52) U.S. Cl.
CPC ......... *G02B 6/0016* (2013.01); *G02B 6/0026* (2013.01); *G02B 6/0035* (2013.01); *G02B 27/4211* (2013.01); *G02B 27/4272* (2013.01); *G02B 27/0172* (2013.01); *G02B 27/4288* (2013.01); *G02B 2027/0112* (2013.01)

(58) Field of Classification Search
USPC .......................................... 359/558, 566–576
See application file for complete search history.

(56) References Cited

U.S. PATENT DOCUMENTS

| | | | |
|---|---|---|---|
| 2006/0228073 A1 | 10/2006 | Mukawa et al. | |
| 2007/0081246 A1* | 4/2007 | Stuck .................. | G02B 5/1861 359/568 |
| 2007/0263285 A1* | 11/2007 | Walter .................. | B42D 15/00 359/566 |
| 2009/0245730 A1* | 10/2009 | Kleemann ............ | G02B 5/1861 385/37 |
| 2010/0091369 A1* | 4/2010 | Hoose .................. | G02B 5/1866 359/568 |
| 2010/0208341 A1 | 8/2010 | Dobschal et al. | |
| 2011/0008399 A1 | 1/2011 | Bugnon et al. | |
| 2011/0139234 A1* | 6/2011 | Iizuka ..................... | G02B 5/18 136/256 |
| 2012/0162771 A1* | 6/2012 | Walter ................. | G02B 5/1809 359/569 |

FOREIGN PATENT DOCUMENTS

| | | |
|---|---|---|
| EP | 1767964 A1 | 3/2007 |
| EP | 2196842 A1 | 6/2010 |
| EP | 2244114 A1 | 10/2010 |
| WO | WO 2006064301 A1 | 6/2006 |
| WO | WO2006064301 A1 | 6/2006 |
| WO | WO 2009077802 A1 | 6/2009 |
| WO | WO 2009077803 A1 | 6/2009 |
| WO | WO 2011110728 A1 | 9/2011 |
| WO | WO 2011113662 A1 | 9/2011 |

* cited by examiner

OPTICAL DEVICE WITH DIFFRACTIVE GRATING

FIELD OF THE INVENTION

The invention relates to optical devices. In particular, the invention relates to out-coupling gratings which can be used in head-up displays (HUDs), near-to-eye displays (NEDs), or exit pupil expanders (EPEs), for example. The present device comprises a light-guiding substrate and a grating arranged within the substrate or on at least portion of a surface of the substrate.

BACKGROUND OF THE INVENTION

HUDs and NEDs comprise tree fundamental parts: a light projector, a computing unit controlling the projector, and an optical combiner which is adapted to show the light from the projector to a see-through display allowing the user of the HUD or NED to see both the scenery behind the display and the projected light without requiring the user to look away from his usual viewpoint. The optical combiner may be based on diffractive optical elements, sometimes referred to as holographic optical elements (HOEs).

WO 2006/064301 discusses near-to-eye display devices comprising diffractive elements for coupling light into an optical substrate and out of the optical substrate. Previous versions, further developments and variations of devices operating with the same general principle are introduced in WO 99/52002, WO 2009/077802, WO 2009/077803 and WO 2011/110728.

US 2009/0245730 discloses a display device operating with the same principle, wherein at least one of the two diffraction gratings is a binary-blazed grating having a multiplicity of diffraction structures, which are composed of a multiplicity of individual substructures that ensure a blaze effect and in plan view have the shape of a closed geometrical surface. The proposed structure aim at providing an optical display device with which the light can both be coupled into the plane plate of the light guide with the highest possible diffraction efficiency by the input grating and coupled out again homogeneously by the output grating.

WO 2011/113662 discloses a diffractive combiner for a color head-up display (HUD) device. The device includes a first optical diffraction grating adapted for diffracting, in a diffraction direction, light having a first wavelength and which is incident on the first grating in an incidence direction, a second optical diffraction grating adapted for diffracting, in the same direction, light having a second wavelength and which is incident on the second grating in the incidence direction. The first and second optical diffraction gratings are formed in relief on first and second opposite surfaces of the combiner. The first and/or second grating is made as a wavelength multiplex optical diffraction grating and is adapted for diffracting in the diffraction direction light at a third wavelength impacting the first and/or second optical diffraction grating in the incidence direction.

At least some of the abovementioned solutions, however, suffer from an undesired effect caused by transmitted light coming through the diffracting gratings to the observer's eye, i.e. the so-called rainbow effect. The rainbow effect shows like a colourful visible pattern in addition to the desired diffracted image. This may make the diffractive combiner element technology practically useless in some applications, unless the problem is solved.

U.S. Pat. No. 4,856,869 discloses a display element including a substrate and a display pattern formed on the substrate, the display pattern having a first diffraction grating structure and a second diffraction grating structure. The direction of the grating lines of the first diffraction grating structure differs from that of the grating lines of the second diffraction grating structure, thereby aiming at preventing the occurrence of a rainbow-like image. The proposed solution is periodic in two directions which causes light to diffract into multiple directions, making individual diffraction orders weaker. Transmitted diffraction orders are, however still considerably strong, whereby the result is far from optimal regarding the rainbow interference image. In addition, the structure is relatively difficult to manufacture.

Thus, there is a need for improved optical devices.

SUMMARY OF THE INVENTION

It is an aim of the invention to provide a new solution which can be used for improving the combiner part of HUD displays, in particular for providing a reduced or totally prevented rainbow effect for transmitted light.

The aim is achieved by the invention as defined in the independent claim.

The present optical device comprises a transparent substrate and a grating on or at least partly within the substrate. The grating comprises a first transparent grating layer which further comprises periodically alternating zones having different refractive indices. The device further comprises a second transparent grating layer located on top of (but not necessarily directly facing) the first grating layer and also comprising periodically alternating zones having different refractive indices. The zones of the first grating layer having higher refractive index are at least partly aligned with the zones of the second grating layer having lower refractive index and vice versa, whereby the second grating layer reduces the amount of light diffracted to non-zero transmission orders compared with a similar structure but without the second grating layer.

Preferably, the periods, layer thicknesses and refractive indices of the first and second grating layers are adapted to make the diffraction efficiency of the transmitted orders, in particular the first transmission order, lower than the diffraction efficiency of the reflection orders, in particular the first reflection order, over the wavelength range of 450-650 nm.

Further, in one embodiment, the diffraction efficiency of the first transmission order is no more than 0.4% and the diffraction efficiency of the first reflection order is at least 3% over the wavelength range of 450-650 nm.

Preferably, the first and second grating layers are periodic in the same direction or, in the case of a doubly periodic grating, in the both orthogonal directions in the plane of the substrate and the grating.

According to a preferred embodiment, the grating structure consists of two successive grating layers, i.e. the first grating layer and the second grating layer, having the same grating period ($\Lambda$). Each grating layer contains two zones with different refractive indices within a single grating period, i.e., the grating layers are so called binary gratings. The grating layers are aligned so that the zones of the first grating layer having higher refractive index are at least partly aligned with the zones of the second grating layer having lower refractive index and vice versa. This kind of two layer grating structure diffracts a significantly smaller amount of light to the non-zero odd transmission orders than the corresponding single layer gratings. This happens when the two grating layers are designed so that light scattered from the first grating layer and the light scattered from the second grating layer interfere destructively in the directions of the non-zero odd transmission orders. The destructive interference occurs between two waves propagating in the same direction when the phase difference is larger than 90 and smaller than 270 deg and is the strongest with the 180 deg phase difference.

The destructive phase shift between the fields scattered from the two grating layers can be obtained conveniently with two binary gratings. If two binary gratings with the ½ duty cycle (i.e. the higher and lower refractive index zones within the grating period are of equal width in the periodic direction of the grating) are otherwise identical but only the locations of the higher and lower refractive index zones are reversed in the second grating, then the phase of the odd reflection and transmission orders produced by the second grating differs by 180 degrees from the phase of the corresponding orders produced by the first grating. Thus, if the gratings were infinitely thin and placed one upon the other, the transmitted (reflected) fields produced by the two grating layers into the directions of odd transmission (reflection) orders would interfere destructively due to the 180 deg phase difference. In practice, the grating layers are not infinitely thin and thus the 180 deg phase difference between the reflected fields in the directions of odd orders is easily lost and the constructive interference takes place. This happens as the incident field scatters directly from the first grating layer whereas in the case of the second grating layer, the incident field first goes through the first grating layer, then the field scatters from the second grating layer, and next the scattered field propagates through the first grating layer and finally interferes with the field that was directly scattered from the first grating layer. With the odd transmission orders, the phase difference of 180 deg is better maintained as the field scattered from the first grating layer needs to travel through the second grating layer, whereas with the second grating layer, the incident field travels through the first grating layer before it scatters from the second grating layer. Thus, with the presented two layer grating structure, it is possible to reduce the diffraction efficiency of the odd transmission orders to such a low level that the rainbow effect is not observable in the transmitted light with a human eye while the structure still reflects significant amount of light into odd and even reflection orders. A clear advantage of the structure is that the low diffraction efficiency of the odd transmission orders can be obtained at all visible wavelengths when the grating structure is properly designed.

The presented grating structure may not reduce the diffraction efficiency of the even transmission orders. However, this is not typically a problem as in many applications the grating period is so small that diffraction efficiency of orders other than 0 and +/−1 is zero or extremely low.

The present invention has the further advantages that the two layer grating structure can be designed so that diffraction efficiency of the zeroth transmission order is nearly wavelength independent through the visible wavelengths and thus no significant changes in color balance are induced when the light transmits through the grating structure and in addition, there is no visually observable image blurring. As it is based on diffractive optics and can be manufactured using established technology, the proposed structure is also relatively inexpensive to produce.

By suitably selecting the period, layer thicknesses and refractive indices of the first and second grating layers, the grating can be made to diffract visible light into non-zero reflection orders without any significant diffraction to non-zero transmission orders. As a result, practically no rainbow effect caused by the transmitted light will be seen at the visible wavelengths of light.

According to one embodiment, at least one, preferably both, of the refractive indices of the second grating layer is the same as in the first grating layer.

According to one embodiment, the first and second grating layers are of equal thickness. This provides maximal suppression of non-zero transmitted diffraction orders and therefore rainbow effect, at least when the internal structures (dimensions and refractive indices) of the grating layers are similar.

Alternatively, the first and second grating layers are non-identical in their material properties and have different thicknesses. This is beneficial if the selection of usable materials is limited and the grating layers cannot be made identical. The thicknesses can be still used to optimize the suppression of the rainbow effect.

According to one embodiment, the zones of the first grating layer having higher refractive index are fully aligned with the zones of the second grating layer having lower refractive index and vice versa. In particular, the second grating layer may have a similar internal structure as the first grating layer but being laterally shifted by half of the grating period in the periodic direction of the grating to provide perfect alignment.

According to one embodiment, at least some of the zones in the first and/or second grating layer comprise the same material as the substrate or material having nearly same refractive index as the substrate. The substrate may comprise microfabricated portion on top of which the grating layers can be manufactured. Some examples of manufacturing techniques are given in the detailed description of embodiments.

According to one embodiment, the grating is provided on a surface of the substrate and comprising a coating layer on the other side of the grating, whereby at least some of the zones in the first and/or second grating layer comprise the same material as the coating layer.

According to one embodiment, at least one, preferably both, of the refractive indices of the second grating layer is the same as in the first grating layer. If one of the refractive indices is the same, the whole grating can be made using only three different materials defining the refractive indices. If both of the refractive indices are the same, the whole grating can be made using only two different materials defining the refractive indices. Otherwise, four different materials defining the refractive indices are needed. All these variations can be used for reducing the rainbow effect. The material configuration of the grating may therefore depend on other requirements of the device.

In a typical configuration, the both grating layers exhibit the same period that is between 300 and 1500 nm and the layer thicknesses of the first and second grating layers are between 5 and 200 nm. The lower refractive index in each of the first and second grating layer is typically between 1.3 and 1.7 and the higher refractive index in each of the first and second grating layer is between 1.5 and 2.2. The grating layers can also contain metals, such as aluminum, gold and silver, or conductive oxides, such as indium tin oxide (ITO), or conductive transparent polymers, such as poly(3,4-ethylenedioxythiophene) (PEDOT) and poly(3,4-ethylenedioxythiophene):poly(styrene sulfonate) (PEDOT:PSS).

As discussed above, the present grating may serve as an out-coupling grating adapted to diffract light directed to the out-coupling grating from the light-guiding substrate outside said substrate, while maintaining transparency of the substrate. Thus, the grating and substrate act as a combiner element for an optical display device. To guide light inside the substrate and further to the out-coupling grating, such devices typically comprise also an in-coupling grating arranged on a different position of the substrate. In addition, a source of light or a projector may be provided for directing light to the in-coupling grating. A fully functional head-up display (HUD), near-to-eye display (NED), or exit pupil expander (EPE) or part thereof is therefore provided.

In addition to the applications indicated above, the present optical device may be used in elements of construction industry, lighting apparatuses or visual aids such as eyewear such as glasses, sunglasses and sports glasses for decorative, security or other purposes. For example, it is possible to manufacture a glass panel with a rainbow effect visible at the outside of a building but not inside of the building. To mention another example, it is possible to make an anti-counterfeiting or authenticity marking on eyewear such that the marking is visible on the outside of the piece of eyewear but does not disturb its normal use.

The present combiner element may in particular take place in an aviation industry display device, automotive industry display device, gaming display device or augmented reality display device, or guided surgery or assembly display device.

Next, embodiments of the invention are described in more detail with reference to the attached drawings, first giving some definitions used.

Unless otherwise mentioned, in the following description, examples and drawings, the following definitions apply:

Diffraction efficiencies have been calculated by the Fourier modal method (also known as Rigorous coupled wave analysis) as average of TE- and TM-polarizations, thereby corresponding to a situation where the grating is subjected to non-polarized light.

Unless otherwise mentioned, in all examples, the period of the grating is 450 nm and the grating is illuminated by a normally incident plane wave. The drawings are not necessarily drawn in scale.

The term "transparent" (e.g. material layer) refers to such structures whose transmittance at the visual wavelength range 450-650 nm is at least 50%.

DETAILED DESCRIPTION OF EMBODIMENTS

Figure 1:
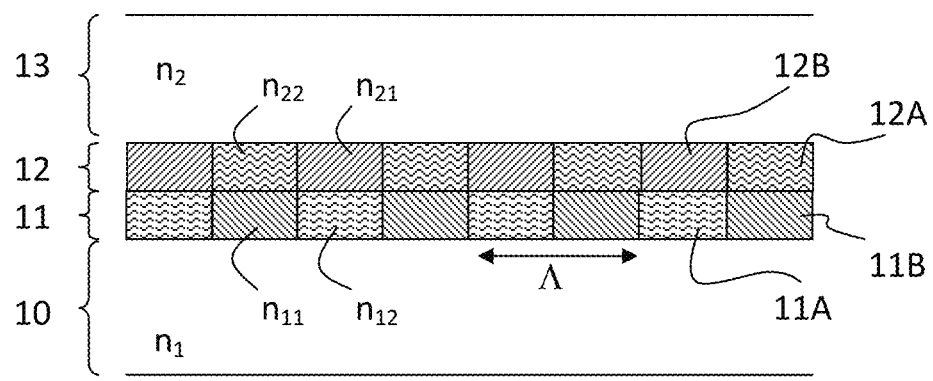
FIG. 1 shows a general representation of a grating structure according to the invention.

FIG. 1 illustrates a general structure of the two-layer grating according to the invention. The grating comprises a first grating layer 11 and a second grating layer 12. The both grating layers have the same grating period ($\Lambda$) and are binary. The first grating layer is composed of a periodic pattern of alternating material zones 11A and 11B having different refractive indices $n_{11}$ and $n_{12}$, respectively. Likewise, the second grating layer is composed of a periodic pattern of alternating material zones 12A and 12B having different refractive indices $n_{21}$ and $n_{22}$, respectively. On the first side of the two-layer grating there is provided a first optically transparent material layer 10 having a refractive index $n_1$ and on the second side of the grating there is provided a second optically transparent material layer 13 having a refractive index $n_2$. The layers 10, 13 on one or both sides of the grating may comprise also air (or vacuum) layers, i.e. lack any solid material.

Figure 2:
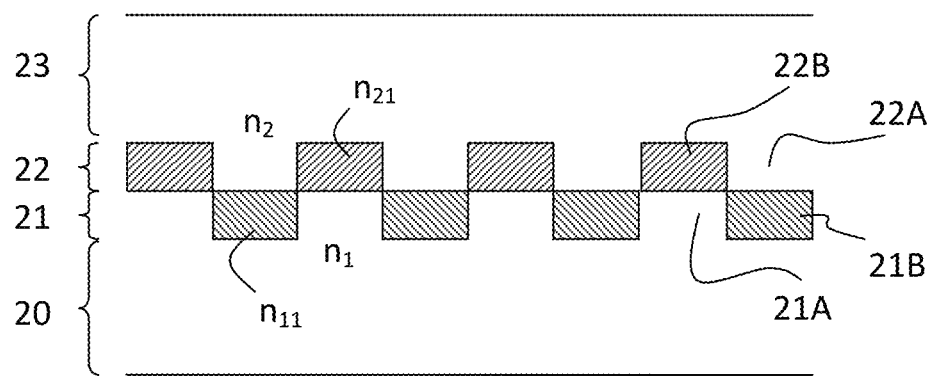
FIG. 2 shows a grating structure according to one embodiment.

A simplified and practically more feasible structure is shown in FIG. 2. The structure comprises a first grating layer 21 and a second grating layer 22, like in FIG. 1. Further, the first grating layer is composed of a periodic pattern of alternating material zones 21A and 21B having different refractive indices $n_{11}$ and $n_1$, respectively. Likewise, the second grating layer is composed of a periodic pattern of alternating material zones 22A and 22B having different refractive indices $n_{21}$ and $n_2$, respectively. The essential difference to FIG. 1 is that the material layers 20, 23 on each side of the grating layers 21, 22 continue seamlessly from the grating zones 21A and 22A, respectively.

Figure 3A:
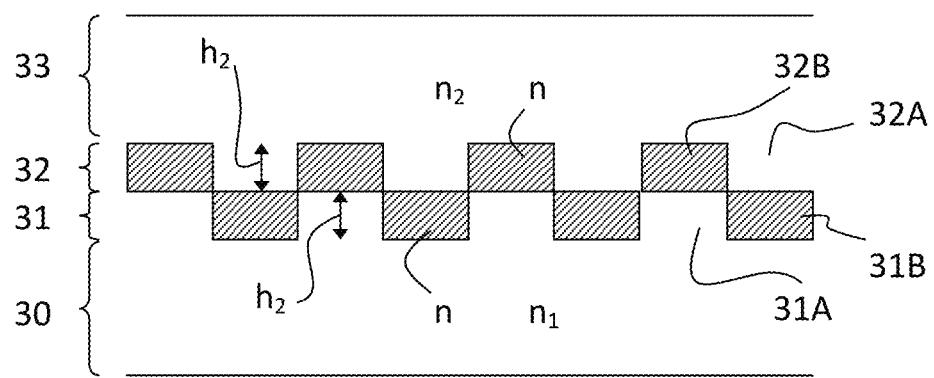
FIG. 3a shows a grating structure according to another embodiment.

A still more simplified structure is shown in FIG. 3a. The structure comprises a first grating layer 31 and a second grating layer 32, like in FIGS. 1 and 2. The grating layers are composed of periodic patterns of alternating material zones 31A, 31B; 32A, 32B having different (within each layer) refractive indices n, $n_1$; n, $n_2$, respectively. Also in this embodiment, the material layers 30, 33 on each side of the grating layers 31, 32 continue seamlessly from the grating zones 31A and 32A, respectively. In this configuration, the materials at one zone 31B, 32B of each of the grating layers 31, 32 are the same and therefore the zones 31B, 32B have the same refractive index n.

It is not excluded that the material zones 31A and 32A would also be made of the same material, i.e., that $n_1=n_2$, whereby only two different materials would be needed to make the proposed structure. The same holds for other structures described herein. Referring to FIG. 1, according to one embodiment, the $n_{11}$ zone ($n_{12}$ zone) of the first grating layer has the same refractive index as the $n_{21}$ zone ($n_{22}$ zone)

of the second grating layer. This embodiment provides for optimal suppression of the odd transmitted diffraction orders when the grating layers are of equal thickness. If $n_{11} \neq n_{21}$ or $n_{12} \neq n_{22}$, then the optimal suppression may be obtained with grating layers having unequal thicknesses.

Figure 3B:
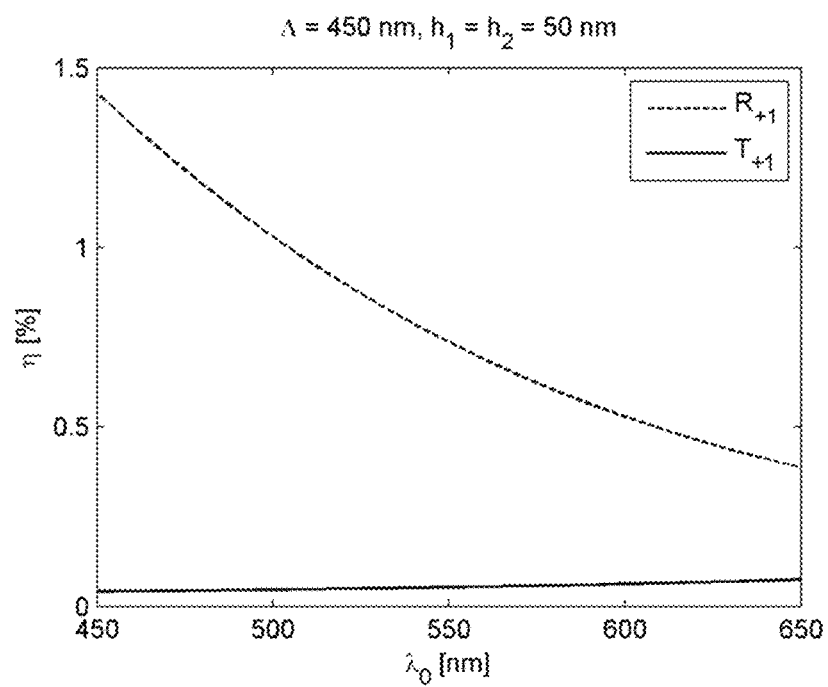
FIG. 3b shows calculated diffraction efficiency of the first reflection ($R_{+1}$) and transmission ($T_{+1}$) order as a function of free space wavelength for a double layer grating structure according to FIG. 3a with exemplary dimensions and refraction indices.
Figure 3C:
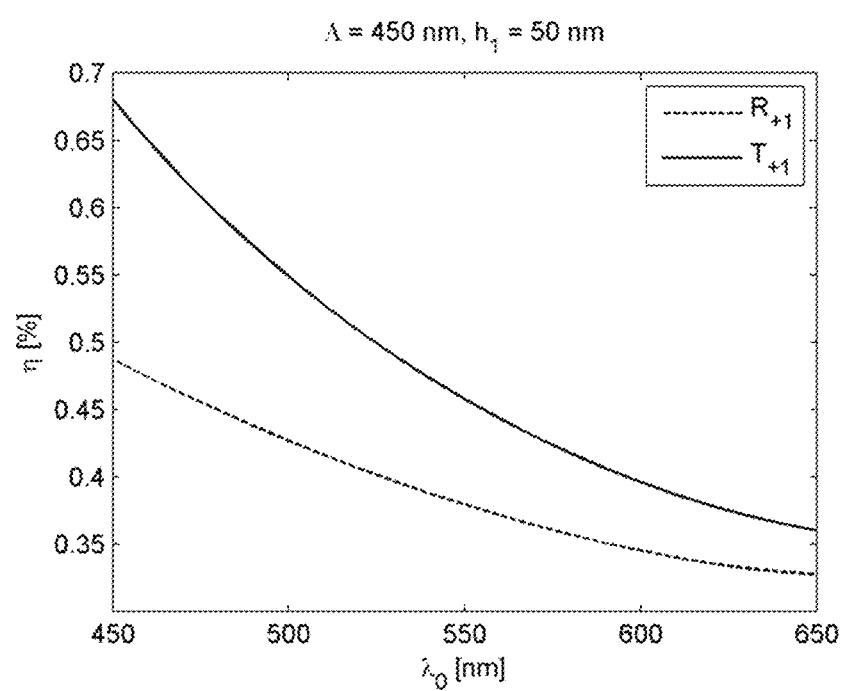
FIG. 3c shows calculated diffraction efficiency of the first reflection ($R_{+1}$) and transmission ($T_{+1}$) order as a function of free space wavelength for a single layer grating structure that is otherwise identical than the structure modeled in FIG. 3b but it contains only one grating layer.

FIG. 3b shows the diffraction efficiency of the first transmission ($T_{+1}$) and the first reflection ($R_{+1}$) order as a function of the free space wavelength ($\lambda_0$) for the structure according to FIG. 3a with the following parameters: $n_1=n_2=1.7$, $n=1.3$, $h_1=h_2=50$ nm and $\Lambda=450$ nm. The structure is illuminated by a normally incident plane wave. FIG. 3c shows the same results for the structure that is otherwise identical than the structure modeled in FIG. 3b but it contains only one grating layer. Clearly, $T_{+1}$ is much weaker in FIG. 3b than in FIG. 3c. All the modeling results presented in this patent application were obtained with the Fourier modal method (also known as rigorous coupled wave analysis) that utilizes the correct Fourier factorization rules to obtain good convergence also with metallic grating structures.

Figure 4A:
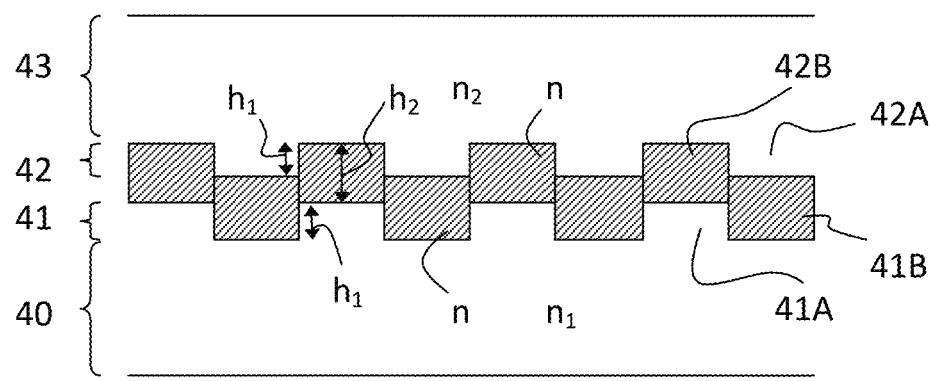
FIG. 4a shows a grating structure according to another embodiment.

FIG. 4a shows a modified structure of the grating in which the alternating material zones material zones 41B, 42B overlap each other in the direction normal to the grating. Thus, there is a unified layer of material with refractive index n between the actual grating layers 41, 42. Also in this embodiment, the material layers 40, 43, having refractive indices $n_1$ and $n_2$, respectively, on each side of the grating layers 41, 42 continue seamlessly from the grating zones 41A and 42A, respectively.

Figure 4B:
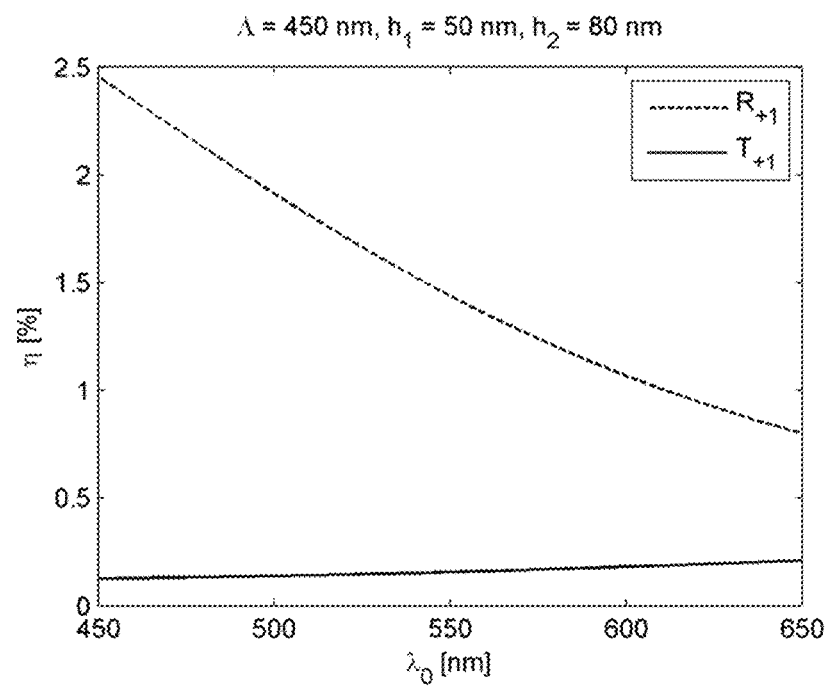
FIG. 4b shows calculated diffraction efficiency of the first reflection ($R_{+1}$) and transmission ($T_{+1}$) order as a function of free space wavelength for the structure according to FIG. 4a with exemplary dimensions and refraction indices.

FIG. 4b shows the diffraction efficiency of the first transmission ($T_{+1}$) and the first reflection ($R_{+1}$) order as a function of the free space wavelength ($\lambda_0$) for the structure according to FIG. 4a with the following parameters: $n_1=n_2=1.7$, $n=1.3$, $h_1=50$ nm, $h_2=80$ nm and $\Lambda=450$ nm. The structure is illuminated by a normally incident plane wave. As compared to FIG. 3b, the 30 nm thick uniform dielectric layer between the 50 nm thick grating layers enhances $R_{+1}$. Also $T_{+1}$ slightly increases but it is still significantly lower than in FIG. 3c.

Figure 5A:
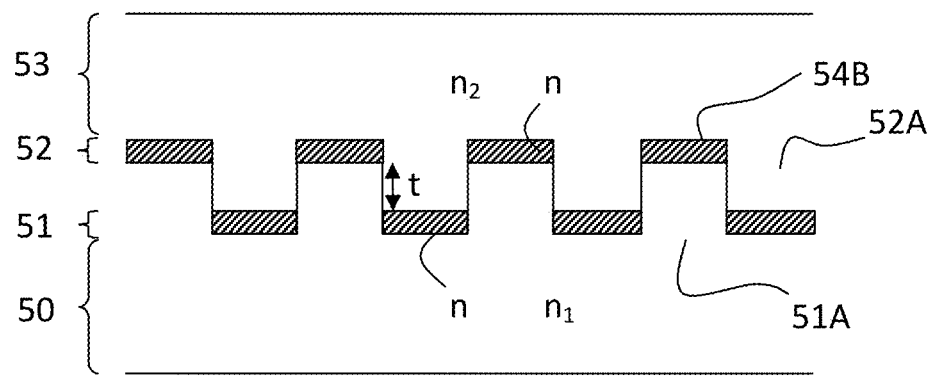
FIG. 5a shows a grating structure realized using metal plating according to another embodiment.

FIG. 5a shows still another embodiment. In this embodiment, the desired double grating is formed by a substrate 50 provided with ridges 51A and having thin layers 54B of metal, such as gold or silver, or some high refractive index material, such as indium tin oxide (ITO), provided in the bottom of each groove 52A and on each ridge 51A formed between the grooves 52A. On the second side of the structure, there is provided an inversely shaped layer 53, 52A.

Figure 5B:
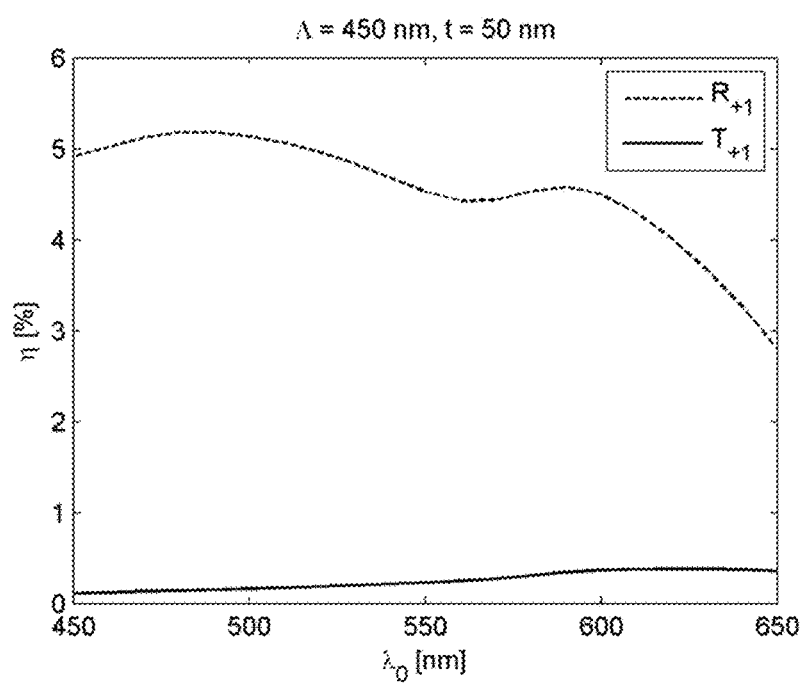
FIG. 5b shows calculated diffraction efficiency of the first reflection ($R_{+1}$) and transmission ($T_{+1}$) order as a function of free space wavelength for the structure according to FIG. 5a with exemplary dimensions and refraction indices.
Figure 5C:
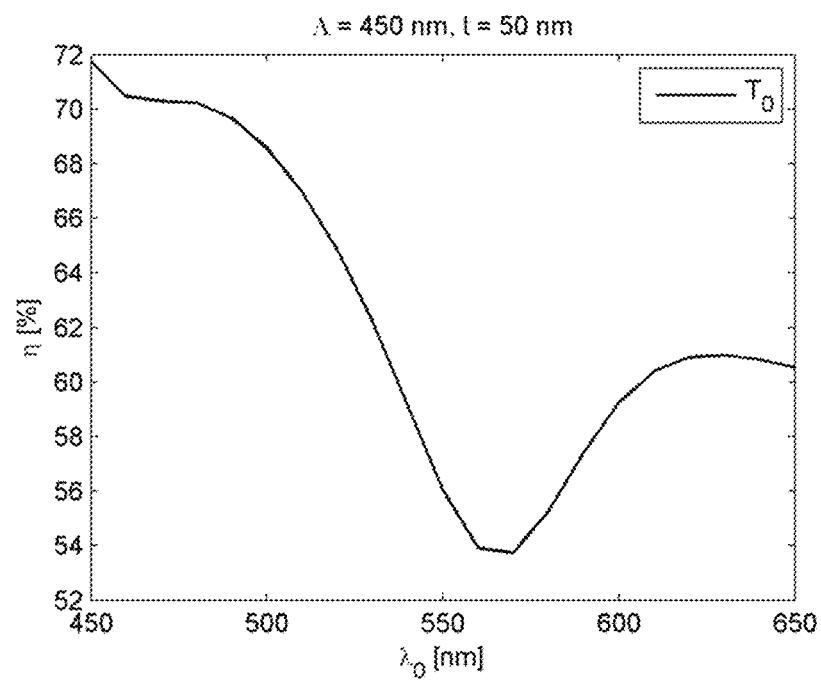
FIG. 5c shows calculated diffraction efficiency of the zeroth transmission order ($T_0$) as a function of free space wavelength for the structure modeled in FIG. 5b.
Figure 5D:
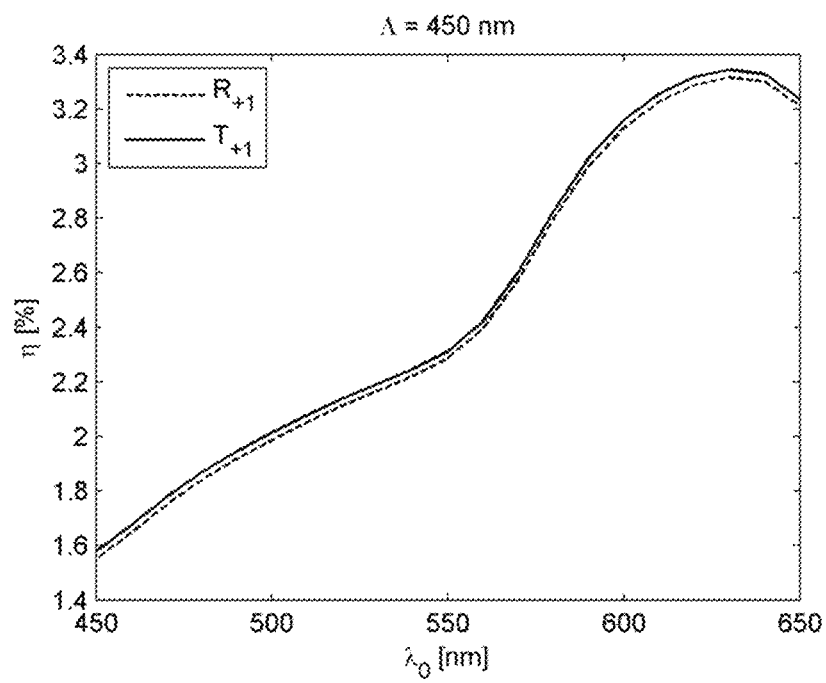
FIG. 5d shows calculated diffraction efficiency of the first reflection ($R_{+1}$) and transmission ($T_{+1}$) order as a function of free space wavelength for the structure that is otherwise identical than the structure modeled in FIG. 5b, but it contains only a single grating layer.

FIG. 5b shows the diffraction efficiency of the first transmission ($T_{+1}$) and the first reflection ($R_{+1}$) order as a function of the free space wavelength ($\lambda_0$) for the structure according to FIG. 5a with the following parameters: $n_1=n_2=1.5$, n=wavelength dependent refractive index of silver (CRC handbook of Chemistry and Physics, $83^{rd}$ edition), t=50 nm, and $\Lambda=450$ nm. The silver zones are 10 nm thick and the structure is illuminated by a normally incident plane wave. FIG. 5b shows the diffraction efficiency of the zeroth transmission order for the same structure. The mean spectral zeroth order transmittance is over 60%. FIG. 5c shows the same results for the structure that contains only single silver grating layer (as in the structure modeled in FIG. 5b, $n_1=n_2$, the structure can be considered to consist of two metallic grating layers separated by a uniform dielectric layer). By comparing FIGS. 5b and 5c, it can be clearly seen that the two layer grating structure diffracts significantly less light into the first transmitted order than the single layer structure.

Figure 6:
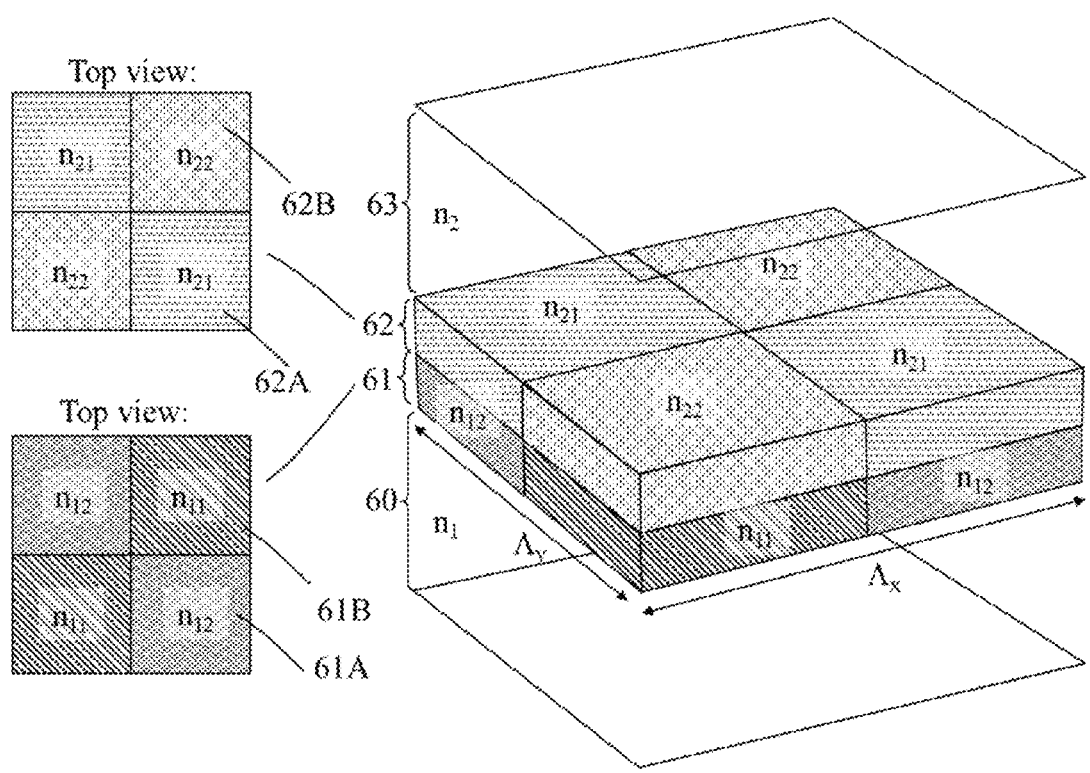
FIG. 6 shows a general representation of a doubly periodic grating structure according to the invention.

The embodiments presented so far have been periodic only in one direction. All the presented embodiments can be implemented also as doubly periodic (also called as biperiodic) structures. A doubly periodic version of the structure of FIG. 3a is shown in FIG. 6. It should be noted that only one unit cell of the doubly periodic grating is illustrated in FIG. 6. The grating consists of two grating layers. The unit cell of each grating layer contains four rectangular zones with equal height, width and depth. Each layer consists of two materials with different refractive indeces. The rectangular material zones in the unit cell of each grating layer are arranged in a checkerboard pattern. The grating layers are aligned so that the zones of the first grating layer having higher refractive index are aligned with the zones of the second grating layer having lower refractive index and vice versa.

In all of the above the ridge and groove regions in both gratings layers are preferably of equal width. In all of the above examples, the alternating zones of the grating layers are shown as fully aligned with each other in the lateral direction of the grating, providing an optimal performance. However, the structure is expected to work also when the zones are partly aligned, e.g. if there is a displacement less than quarter of the period of the grating from the optimal situation.

The two grating layers may be directly superimposed or be separated by a distance, which is typically less than the width of the ridges and grooves.

The structures of FIGS. 2, 3a, 4a and 5a can all be manufactured by
  a) providing an optically transparent bottom substrate having a refractive index $n_1$,
  b) manufacturing a sequence of grooves and ridges to the bottom substrate,
  c) depositing into the grooves first zones of optically transparent material having a refractive index $n_{11}$ or n to complete the first grating layer,
  d) depositing on the ridges second zones of optically transparent material having a refractive index $n_{21}$ or n,
  e) depositing between the second zones, and, optionally also on top of the second zones as a uniform coating layer, optically transparent material having a refractive index $n_2$ (which can be but does not need to be equal to $n_1$).

In the case of the structure of FIG. 3, the manufacturing steps (c) and (d) can be accomplished by a single deposition. That is, when the grooves of the first grating are filled by a material having refractive index n, the ridge zones of the second grating layer are simultaneously formed.

The grooves and ridges to the substrate may be provided using any known microfabrication technique, such as mechanical engraving, (hot) embossing, laser (e-beam) fabrication, etching or material deposition technique such as nanoimprinting.

Deposition of the material zones of the grating layers with a refractive index different from the substrate and top layer preferably takes place using printing methods, such as gravure, reverse-gravure, flexographic and screen printing, coating methods, spraying methods, or commonly known thin film deposition methods such as thermal evaporation, sputtering and atomic layer deposition.

The top layer may be provided by a suitable coating, spraying or printing method.

The substrate and top layer materials may comprise e.g. glass, polystyrene (PS), Polyethylene terephthalate (PET), Poly(methyl methacrylate) (PMMA), polycarbonate, cellulose acetate, polyvinylpyrrolidone, or ethylcellulose.

The alternative material zones may comprise e.g. sulfonated fluoropolymers like Nafion®.

The materials and refractive indices may also be interchanged.

In the case of FIG. 5a, the metal-containing layer may be deposited using e.g. vapour-deposition methods such as chemical vapour deposition (CVD), atomic layer deposition (ALD) or any modification thereof. The thickness of the metal-containing layer may be e.g. 1-50 nm, preferably 5-20 nm.

The invention claimed is:

1. An optical device wherein the device is a near-to-eye display (NED) or an exit pupil expander (EPE) or part thereof comprising:
   a transparent substrate,
   a grating on or within the substrate, the grating comprising a first transparent grating layer which further comprises periodically alternating zones having different refractive indices, wherein the grating has a second transparent grating layer located on the first grating layer and also has periodically alternating zones having different refractive indices so that the zones of the first grating layer having higher refractive index are at least partly aligned with the zones of the second grating layer having lower refractive index and vice versa, wherein said first and second grating layers diffract light to produce a first transmission order having a diffraction efficiency and a first reflection order having a diffraction efficiency, wherein the period, layer thicknesses and refractive indices of the first and second grating layers are adapted to allow diffraction of light by the grating to non-zero reflection orders and to make the diffraction efficiency of the first transmission order lower than the diffraction efficiency of the first reflection order over the wavelength range of 450-650 nm for preventing visible rainbow effect caused by transmitted light; wherein said grating is an out-coupling grating adapted to diffract light directed to the out-coupling grating from the substrate on the surface of which or within which the out-coupling grating is located; and
   an in-coupling grating adapted to diffract light from the outside of the substrate into the substrate and further towards the out-coupling grating so that light propagates in the light-guiding substrate via total internal reflections.

2. The optical device according to claim 1, wherein the diffraction efficiency of the first transmission order is no more than 0.4% and the diffraction efficiency of the first reflection order at least 3% over the wavelength range of 450-650 nm.

3. The optical device according to claim 1, wherein the first and second grating layers have the same grating period and each comprise two types of zones having different refractive indices with a single grating period.

4. The optical device according to claim 1, wherein the first and second grating layers are of equal thickness.

5. The optical device according to claim 1, wherein the first and second grating layers are non-identical in their material properties and have different thicknesses.

6. The optical device according to claim 1, wherein at least one of the refractive indices of the second grating layer is the same as in the first grating layer.

7. The optical device according to claim 1, wherein the first and second grating layers are periodic in the same direction or directions.

8. The optical device according to claim 1, wherein the zones of the first grating layer having higher refractive index are fully aligned with the zones of the second grating layer having lower refractive index and vice versa.

9. The optical device according to claim 1, wherein the second grating layer has a similar internal structure as the first grating layer but being laterally shifted by half of the grating period in the periodic direction of the grating.

10. The optical device according to claim 1, wherein the first and the second grating layers are separated by a uniform dielectric layer.

11. The optical device according to claim 1, wherein at least some of the zones in the first and/or second grating layer comprise the same material as the substrate or material that has nearly the same refractive index as the substrate.

12. The optical device according to claim 1, wherein the grating is provided on a surface of the substrate and has a coating layer on the other side of the grating, whereby at least some of the zones in the first and/or second grating layer comprise the same material as the coating layer.

13. The optical device according to claim 1, wherein a period of the first and second grating layers is between 300 nm and 1500 nm and the layer thicknesses of the first and second grating layers are between 5 nm and 200 nm.

14. The optical device according to claim 1, wherein the lower refractive index in each of the first and second grating layer is between 1.3 and 1.7 and the higher refractive index in each of the first and second grating layer is between 1.5 and 2.2.

15. The optical device according to claim 1, further comprising a light projector capable of illuminating the in-coupling grating on the surface the substrate.

16. The optical device according to claim 1, wherein the two layer grating structure is doubly periodic.

17. The optical device according to claim 1, wherein the device is a transparent element used in the construction industry, as a lighting apparatus or as a visual aid such as eyewear.

* * * * *